March 10, 1942. T. J. J. A. MANDERS 2,276,223
SEARCHLIGHT INSTALLATION
Filed May 1, 1940
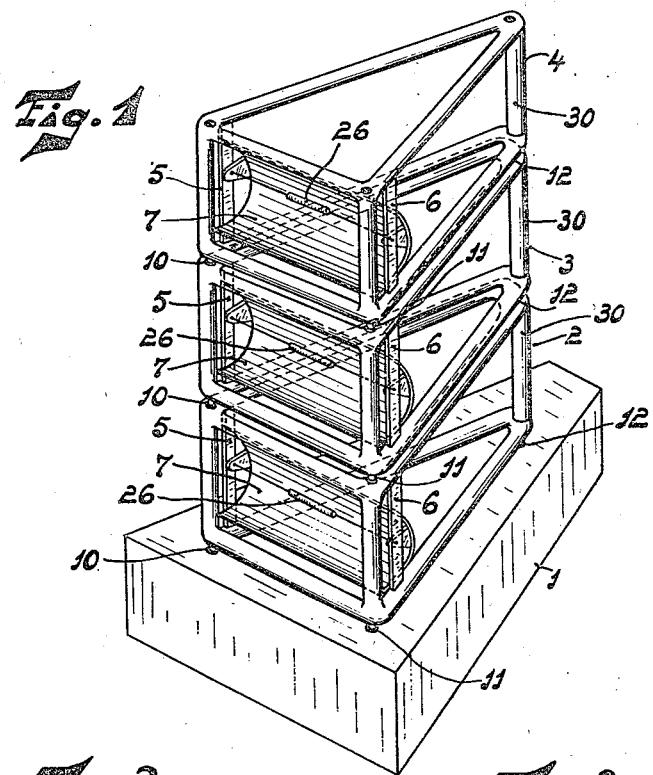
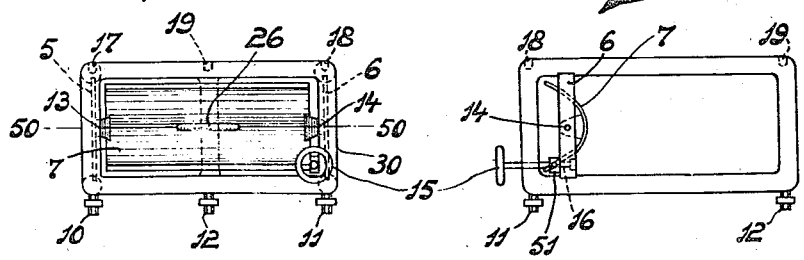
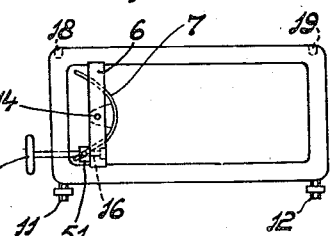
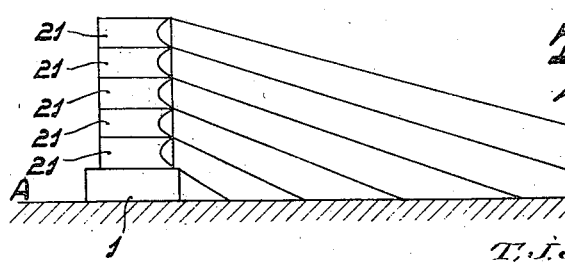

Patented Mar. 10, 1942

2,276,223

UNITED STATES PATENT OFFICE 2,276,223

SEARCHLIGHT INSTALLATION

Theodorus Josephus Jacobus Alphonsus Manders, Eindhoven, Netherlands, assignor, by mesne assignments, to Hartford National Bank and Trust Company, Hartford, Conn., as trustee Application May 1, 1940, Serial No. 332,820
In the Netherlands April 21, 1939

3 Claims. (Cl. 240—1.2)

My invention relates to searchlight installations for illuminating a large surface area, such as a landing field for aeroplanes.

The main object of my invention is to provide an installation which can be readily adjusted so as to illuminate surfaces of different areas and to illuminate a surface in different manners.

The installation according to the invention comprises a plurality of illuminating units which are piled one on top of the other. Each unit comprises a light source and optical projecting means, such as mirrors, lenses and the like, and means are provided to adjust the direction of the beam of light of each unit relatively to the beams of light produced by the other units.

The means for adjusting the direction of the light beams of the units may be of various types. For example, I may support each unit from the unit below by means of one or more adjustable supports so as to obtain an adjustment of the beam in an upward direction, and if desired also in a lateral direction. The adjustment of the beam may also be accomplished by optical means which are movable relatively to the light source.

The installation according to the invention has the advantage that any desired number of units may be piled one on top of the other to obtain the desired arrangement, and the number of units can be readily increased or decreased depending upon the size of the illuminated surface while using a standard base. Furthermore, as the direction of the light beams of each unit is adjustable, the beams of the several units can be directed so as to adjoin the other where they strike the surface of the landing field. This can be effected very advantageously especially when the units are provided with linear light sources which extend perpendicular to the direction in which the units are piled.

In order that the invention may be clearly understood and readily carried into effect, I shall describe the same in more detail with reference to the accompanying drawing in which:

Figure 1 is a perspective view of an installation according to the invention,

Fig. 2 is a front view of an illuminating unit according to the invention,

Fig. 3 is a side view of Fig. 2, and

Fig. 4 is a side view of an installation for illuminating a landing field.

The installation shown in Fig. 1 comprises a base 1 upon which three units 2, 3 and 4 are piled. The units 2, 3, and 4 are of similar construction and comprise a wedge-shaped frame 30 made, for instance, of steel tubing. Secured at the sides of the frame are two vertical strips 5 and 6 which carry a reflector 7 in the form of a cylindrical parabolic mirror. Arranged with its axis coinciding with the focal axis of the reflector 7 and substantially perpendicular to the direction in which the units 2, 3 and 4 are piled, is a linear light source 26 which is supported from the strips 5 and 6. The light sources are energized by suitable means (not shown).

The light source 26 may be a water-cooled high-pressure metal vapor lamp of the type described in the U. S. Patent #2,094,694 to Cornelis Bol et al. In such cases the apparatus necessary for supplying the cooling liquid to the lamps may be located within the rear portions of the frames.

The top of each frame, as well as the upper surface of the base 1, is provided with three cavities 17, 18, and 19 (see Figs. 2 and 3) into which fit the ends of adjusting screw-supports 10, 11 and 12. The adjusting supports 10, 11 and 12 may be cap screws which engage threaded holes at the bottom corners of the frames 30.

The screws 10, 11 and 12 allow one to adjust the main direction of the light beams of any unit relatively to the beams of the other units and also to simultaneously raise or lower the main direction of the light beams of all the units. For example, by adjusting the screws 10 and 11 at the bottom of unit 2, the light beams of all the units may be raised or lowered. If it is desired to raise only the beam of unit 2, the beams of units 3 and 4 can then be lowered to their original positions by adjusting screws 10 and 11 at the bottom of unit 3. It is desired to raise the beam of unit 4 relatively to those of units 2 and 3, this can be accomplished by adjusting the screws 10 and 11 at the bottom of unit 4. It will be apparent to one skilled in the art that the several light beams can be adjusted relatively to each other by proper manipulation of the screens 10, 11 and 12. Furthermore, because of the use of this type of adjustment it is possible to readily remove or add units to meet illuminating requirements.

The unit shown in Figures 2 and 3 is similar to that shown in Fig. 1 in that it has a frame 30 provided with the cavities 17, 18 and 19, adjusting supports 10, 11 and 12, light source 26, and mirror 7. However, in Figures 2 and 3 the mirror is pivoted on members 5 and 6 at points 13 and 14 which lie on the longitudinal axis 50—50 of the light source as well as the focal line of the mirror. The mirror 7 can be rotated about the axis 50—50 by means of an adjusting screw 16 provided with a hand wheel 15. The end of adjusting screw 16 is fixedly held in an axial direction by being secured to member 6 and carries a threaded collar secured to the lower end of mirror 7.

The screws 10, 11 and 12 serve to support one unit from another and to allow adjustment of the direction of the light beam in all directions, as described in connection with Fig. 1. The use of the adjusting screw 16 permits the mirror 7 to be adjusted relative to the light source to thereby change the angle of inclination of the light beam.

In Fig. 4 the line A—A indicates the surface of a landing field. Mounted on the base 1 are five illuminating units 21, which may have the construction of the units 2, 3, and 4 of Fig. 1 or of the unit shown in Figs. 2 and 3. The units 21 are so adjusted in the manner described in connection with Figures 1 to 3 that the five light beams just adjoin each other at the surface A—A and that this surface is illuminated by five adjacent and adjoining patches of light.

Although I have described my invention with reference to specific examples, I do not desire to be limited thereto because obvious modifications will appear to one skilled in this art. For example, one may use reflectors of other shapes, such as paraboloids of revolution, together with a punctiform light such as an incandescent lamp, and may use lenses instead of reflectors.

What I claim is:

1. A searchlight installation comprising a plurality of illuminating units piled one upon the other in a column, each unit comprising a linear light source having its longitudinal axis extending substantially perpendicular to the axis of the column, a frame, optical means for directing the light into a beam, and a plurality of adjusting supports bearing upon the frame of the adjacent unit.

2. A searchlight installation comprising a plurality of illuminating units piled one above the other in a column, each unit comprising a frame, a light source, optical means for directing the light into a beam, and adjusting means including a plurality of members adjustably secured to the frame and bearing upon the frame of the adjacent lower unit, the adjusting means of each unit acting as the sole support for the unit.

3. A searchlight installation comprising a plurality of illuminating units piled one above the other in a column, each unit comprising a frame, a light source, optical means for directing the light into a beam, adjusting means including a plurality of members adjustably secured to the frame and bearing upon the frame of the adjacent lower unit, the adjusting means of each unit acting as the sole support for the unit, and means for individually adjusting the optical means of the illuminating units.

THEODORUS JOSEPHUS JACOBUS
ALPHONSUS MANDERS.